US008758948B2

(12) United States Patent
Narayan et al.

(10) Patent No.: US 8,758,948 B2
(45) Date of Patent: Jun. 24, 2014

(54) IRON-AIR RECHARGEABLE BATTERY

(75) Inventors: Sri R. Narayan, Arcadia, CA (US); G.K. Surya Prakash, Hacienda Heights, CA (US); Andrew Kindler, San Marino, CA (US)

(73) Assignees: University of Southern California, Los Angeles, CA (US); California Institute of Technology, Pasadena, CA (US)

( * ) Notice: Subject to any disclaimer, the term of this patent is extended or adjusted under 35 U.S.C. 154(b) by 2 days.

(21) Appl. No.: 13/189,038

(22) Filed: Jul. 22, 2011

(65) Prior Publication Data

US 2012/0187918 A1 Jul. 26, 2012

Related U.S. Application Data

(60) Provisional application No. 61/366,696, filed on Jul. 22, 2010.

(51) Int. Cl.
*H01M 12/06* (2006.01)
*H01M 4/90* (2006.01)

(52) U.S. Cl.
USPC ........................................... 429/405; 429/403

(58) Field of Classification Search
USPC ................................. 429/402–407
See application file for complete search history.

(56) References Cited

U.S. PATENT DOCUMENTS

| 3,935,027 A * | 1/1976 | Warde et al. ............... 429/406 |
| 4,032,693 A | 6/1977 | Lindstrom |
| 4,047,894 A * | 9/1977 | Kuhl .......................... 261/101 |
| 5,254,414 A * | 10/1993 | Tsenter ....................... 429/406 |
| 6,899,971 B2 | 5/2005 | Hamada et al. |
| 7,695,840 B2 | 4/2010 | Bartling |
| 2003/0054208 A1 | 3/2003 | Oehr et al. |
| 2004/0137310 A1* | 7/2004 | Kiros ........................... 429/42 |
| 2005/0112451 A1 | 5/2005 | Lee et al. |
| 2005/0271932 A1 | 12/2005 | Wang |
| 2007/0077485 A1* | 4/2007 | Takamura et al. ............ 429/82 |
| 2007/0077491 A1 | 4/2007 | Burchardt |
| 2011/0027666 A1 | 2/2011 | Burchardt et al. |

FOREIGN PATENT DOCUMENTS

| EP | 677883 A1 * | 10/1995 |
| JP | 2008293678 | 12/2008 |
| JP | 2009129646 | 6/2009 |
| WO | WO 2005004260 A1 * | 1/2005 |

OTHER PUBLICATIONS

M. Volmer et al., "Electrochemical and Electron Spectroscopic Investigations of Iron Surfaces Modified with Thiols", Surface and Interface Analysis, vol. 16, 278-282 (1990).
K. Vijayamohanan et al., "Kinetics of Electrode Reactions Occurring on Porous Iron Electrodes in Alkaline Media", J. Electroanal. Chem., 295 (1990) pp. 59-70.

(Continued)

*Primary Examiner* — Gregg Cantelmo
(74) *Attorney, Agent, or Firm* — Brooks Kushman P.C.

(57) ABSTRACT

Embodiments include an iron-air rechargeable battery having a composite electrode including an iron electrode and a hydrogen electrode integrated therewith. An air electrode is spaced from the iron electrode and an electrolyte is provided in contact with the air electrode and the iron electrodes. Various additives and catalysts are disclosed with respect to the iron electrode, air electrode, and electrolyte for increasing battery efficiency and cycle life.

35 Claims, 3 Drawing Sheets

(56) References Cited

OTHER PUBLICATIONS

K. Vijayamohanan et al., "Rechargeable Alkaline Iron Electrodes", Journal of Power Sources, 34 (1991) pp. 269-285.

M.K. Debe et al., "Structural Characteristics of a Uniquely Nanostructured Organic Thin Film", J. Vac. Sci. Technol. B 13(3), May/Jun. 1995, pp. 1236-1241.

T. S. Balasubramanian et al., "Effect of Metal-Sulfide Additives on Charge/Discharge Reactions of the Alkaline Iron Electrode", Journal of Power Sources, 41 (1993), pp. 99-105.

K. Vijayamohanan et al., "Role of Sulphide Additives on the Performance of Alkaline Iron Electrodes", J. Electroanal. Chem. 289 (1990), pp. 55-68.

International Search Report and Written Opinion for PCT/US2011/045030 dated Feb. 27, 2012.

International Search Report and Written Opinion for PCT/US2012/042750 dated Jan. 30, 2013.

\* cited by examiner

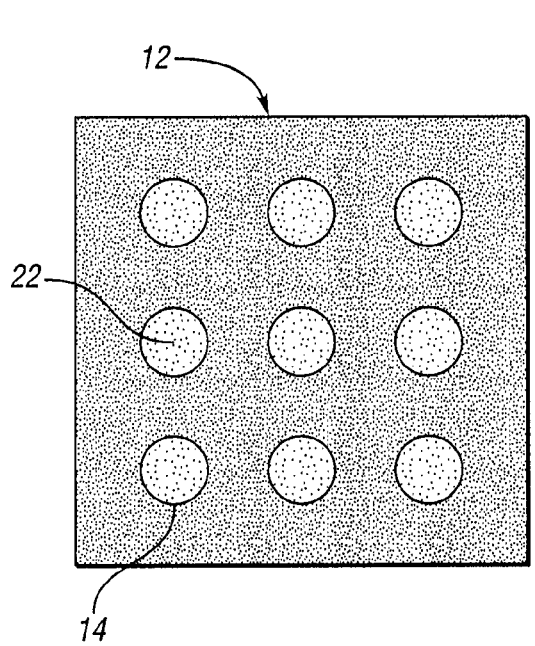
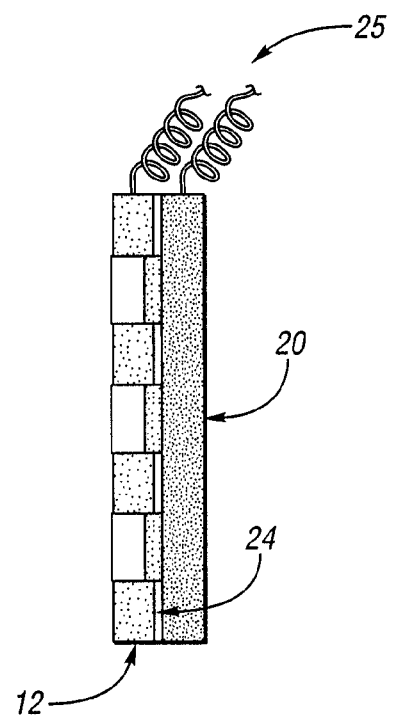
Fig. 2a　　Fig. 2b
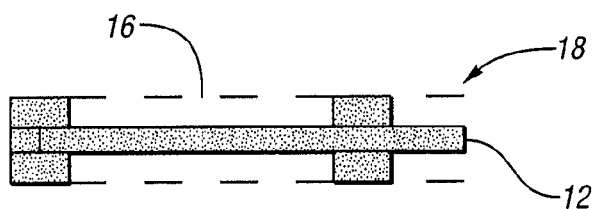
Fig. 3

IRON-AIR RECHARGEABLE BATTERY

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

CROSS-REFERENCE TO RELATED APPLICATIONS

This application claims the benefit of U.S. provisional Application No. 61/366,696 filed Jul. 22, 2010, the disclosure of which is incorporated in its entirety by reference herein.

TECHNICAL FIELD

Embodiments herein relate to an iron-air rechargeable battery.

BACKGROUND

The Westinghouse Corporation, the Swedish National Development Corporation and others avidly pursued the development of the iron-air battery during the mid-1970s and early 1980s for use in electric vehicles. However, the energy density and power density of these batteries did not reach the desired targets set for electric vehicle applications.

Advantages for potential use of the iron-air battery in grid-scale energy storage applications are compelling. An iron-air battery is less expensive than other batteries, with iron only costing $0.10 per pound. The United States has over 100 billion tons of iron ore resources, which translate to over 10,000 teraWh of energy storage. Iron is non-toxic and easily recyclable. The iron-air battery has a high energy density, with a theoretical specific energy of 764 Wh/kg. Even at 20% of this value (154 Wh/kg), it is comparable to the specific energy of Li-Ion batteries. The iron electrode is robust, with over 3000 cycles demonstrated with the iron electrode in nickel-iron batteries. Furthermore, the iron electrode is very tolerant to overcharge, over-discharge, and open circuit stand.

Current iron-air batteries have a moderate energy density (50-75 Wh/kg), moderate cycle life (2000 cycles), are low cost (<$100/kWh), are environmentally friendly, are constructed from abundant raw materials, and are easily scalable. However, the round-trip energy efficiency and cycle life of the iron-air battery require improvement.

SUMMARY

In one embodiment, an iron-air rechargeable battery is provided comprising a composite electrode including an iron electrode and a hydrogen electrode integrated therewith, an air electrode spaced from the composite electrode, and an electrolyte in contact with the composite electrode and the air electrode. In another embodiment, an iron-air rechargeable battery is provided comprising an iron electrode, an air electrode spaced from the iron electrode, the air electrode including a thin film nano-structured catalyst layer supported on a gas diffusion layer, and an electrolyte in contact with the iron electrode and the air electrode. In another embodiment, a method for charging an iron-air battery is provided, the battery comprising a composite electrode include an iron electrode and a hydrogen electrode integrated therewith, an air electrode spaced from the iron electrode, and an electrolyte in contact with the iron electrode and the air electrode. The method includes charging the iron electrode while allowing the hydrogen electrode to discharge at the same time, and isolating the iron electrode and the hydrogen electrode during discharge so that only the iron electrode is involved in power delivery.

BRIEF DESCRIPTION OF THE DRAWINGS

FIGS. 2a and 2b are front and side elevational views, respectively, of an iron electrode in accordance with an embodiment;

FIG. 3 is a side elevational view of an iron electrode according to another embodiment.

DETAILED DESCRIPTION

Figure 1:
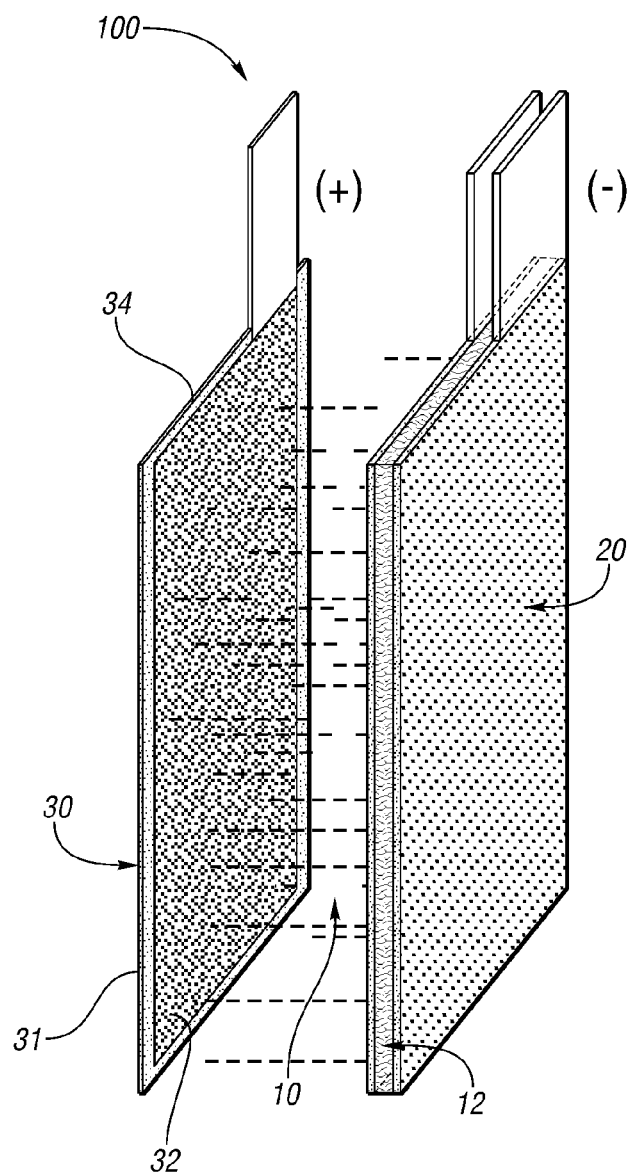
FIG. 1 is a schematic representation of an iron-air battery depicting several features of the iron electrode and air electrode in accordance with embodiments disclosed herein.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments disclosed herein are directed at a high performance iron-air rechargeable battery. Such a battery technology can be transformational because of the extremely low cost of iron, the environmental friendliness of iron and air, and the abundance of raw materials. The iron-air battery is an excellent candidate for grid-scale energy storage, wherein embodiments disclosed herein address its efficiency and cycle life issues, aiming at raising the round-trip energy efficiency from 50% to 80%, and the cycle life from 2000 to 5000 cycles.

The overall cell reaction in an iron-air battery that leads to generation of electrical energy is given by Eq. 1.

$$Fe + \tfrac{1}{2}O_2 + H_2O \rightarrow Fe(OH)_2 \qquad (1)$$

The backward reaction in Eq. 1 takes place during charging. During discharge, iron on the negative electrode is oxidized to iron (II) hydroxide and oxygen is reduced at the positive electrode to form water. These processes are reversed during charging of the battery. The individual electrode reactions during discharge are given by:

$$(+)\text{Electrode: } \tfrac{1}{2}O_2 + H_2O + 2e^- \rightarrow 2OH^-; \qquad (1a)$$

$$(-)\text{Electrode: } Fe + 2OH^- \rightarrow Fe(OH)_2 + 2e^- \qquad (1b)$$

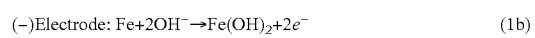

Efficiency.

An iron-air battery has an open circuit cell voltage of about 1.28V and a theoretical energy density of 764 Wh/kg. While the current densities are at least an order of magnitude higher than would be used for discharge of batteries for grid-scale electrical storage, there is a 0.5V difference between the charge and discharge voltages. This difference in charge/discharge voltages arises mainly from the poor performance of the air electrode. This voltage loss contributes significantly to the low round-trip efficiency of 50% of current iron-air batteries, 20% loss of capacity in 14 days, and 10% loss of faradic charge efficiency. Although grid-scale energy storage applications will not require current densities as high as used in electric vehicle batteries, efficiency is still a significant issue.

The iron electrode also undergoes self-discharge by reaction with the electrolyte and evolves hydrogen according to the following chemical reaction:

$$Fe + 2H_2O \rightarrow Fe(OH)_2 + H_2 \quad (Eq\ 2)$$

A considerable loss of efficiency and electrolyte occurs if the evolved hydrogen is left unutilized. The electrode potential for hydrogen evolution is close to that of the iron-electrode reaction, and therefore hydrogen evolves on the iron electrode during charging as well. Since this hydrogen does not take part in the discharge reaction (Eq 1 b), the round-trip efficiency is further reduced.

Cycle Life.

The iron electrode is one of the most robust electrodes known to battery electrochemists. The iron electrode has been shown to withstand over 3000 cycles with no significant degradation in nickel-iron batteries (S. Falk and A. F. Salkind, Alkaline Storage Batteries, 1969, Wiley Interscience, New York; K. Vijayamohanan et al., J. of Power Sources, 1991, (34), 269-285). Unlike zinc electrodes, the iron electrode does not suffer from shape change upon cycling and is also extremely tolerant to overcharge and over-discharge.

The air electrode however, is limited to about 1000-2000 cycles as repeated charge and discharge results in the degradation of the electrode. Carbon is typically used as a support material for the catalysts used in the air electrode. During charging, this carbon support undergoes electro-oxidation resulting in the loss of hydrophobicity and mechanical integrity of the electrode, thereby leading to flooding and loss of performance. Further, potassium carbonate formed by the reaction of carbon dioxide present in air with the electrolyte leads to blocking of pores and increasing the barrier to transport of oxygen and consequent loss of performance.

To address these deficiencies, embodiments disclosed herein endeavor to raise the round-trip energy efficiency of the iron-air battery to 80% and increase its cycle life to 5000 cycles for grid-scale energy storage applications. FIG. 1 illustrates several of the embodiments on an iron-air battery 100 described below.

In one embodiment, self-assembling organic sulfur-based additives, such as about 10 ppm to 10,000 ppm in one implementation, and about 1,000 ppm to 5,000 ppm in another implementation, are employed in the electrolyte 10 that preferentially adsorb on the iron electrode 12 to exclude water and inhibit hydrogen evolution during stand, thus addressing the loss of energy by self-discharge.

Self-discharge of the iron electrode 12 to generate hydrogen occurs due to the reaction of iron with water in the electrolyte 10 according to the following chemical reaction:

$$Fe + 2H_2O \rightarrow Fe(OH)_2 + H_2 \quad (2)$$

This reaction can be prevented by excluding water from the surface of the iron electrode 12. Long-chain alkane thiols, alkyl disulfides, unsubstituted and substituted aryl thiols, and hydroxyalkanethiols are known to self-assemble water repellent monolayers on electrodes. Examples of suitable substituents include, but are not limited to, $NO_2$, $C_1$-$C_6$ alkyl, halogen (e.g., Cl, Br, F, I), $SO_3H$, OH, $C_1$-$C_6$ alkoxide, phenyl, and the like. This embodiment exploits this property to exclude water from the iron electrode 12, thereby suppressing self-discharge.

Studies have shown that organo-sulfur compounds such as alkane thiols self-assemble into monolayers and exclude water from electrode surfaces. Self-assembled monolayers (SAMs) formed from 1-dodecanethiol have been found to be effective in protecting copper and iron from corrosion in aerated solutions (Y. Yamamoto et al., J. Electrochem Soc, 1993, (140) 436). Another important aspect of this self-assembly is its selectivity. The SAMs are formed only on the bare surface of iron and not on surfaces covered with oxides or hydroxides (M. Volmer et al., Surf. Interface Anal. 1990, (16) 278). Thus, the protection needed against self-discharge can be preferentially bestowed on the iron particles without affecting the oxide or hydroxide materials. Organo-disulfides also form SAMs similar to the thiols (M. Volmer et al., Surf. Interface Anal. 1990, (16) 278). By adjusting the length of the alkane chain and the end groups of the alkane thiols and organo-disulphides, the water exclusion properties of the self-assembled layers can be modified. For example, results of the varied water repellency of copper surfaces covered with different thiols are shown in the following table. (Y. Yamamoto et al., J. Elec. Chem. Soc, 1993, (140) 436).

| Surface Type/alkanethiol | Contact Angle, Degrees |
| --- | --- |
| Uncovered copper | 27.8 |
| 1-octadecanethiol | 122.9 |
| 1-dodecanethiol | 121.2 |
| 11-mercapto-1-undecanol | 42.7 |

In one embodiment, non-toxic bismuth additives, such as about 0.1% to 10% in one implementation, and about 1% to 5% in another implementation, are used to suppress hydrogen evolution during charge and improve charge efficiency.

The reaction that occurs at the iron electrode 12 during charging is given by, $$Fe + 2OH^- \rightarrow Fe(OH)_2 + 2e^- \quad (1b)$$

But during charging the following reaction (Eq. 3) also takes place on the surface of iron and this competes with the main reaction (Eq 1 b), resulting in a loss of charging efficiency.

$$2H_2O + 2e^- \rightarrow H_2 + 2OH^- \quad (3)$$

By using bismuth additives to the iron electrode 12, this parasitic side reaction (Eq. 3) is suppressed and thereby the charging efficiency is increased. Bismuth has a high hydrogen evolution overpotential (very slow kinetics) and hence can be used to inhibit the hydrogen evolution reaction (Eq 3). Other elements that exhibit high hydrogen overpotentials include mercury and lead. But unlike lead and mercury, bismuth is completely non-toxic and thus preserves the environmental friendliness of the iron-air battery. Bismuth has been successfully used in zinc batteries as a substitute for mercury (M. Yano et al., J. Power Sources, 1998, (74), 129). Bismuth sulfide additives have been shown to have a beneficial effect on the charging characteristics of the iron electrode (T. S. Balasubramanian; A. K. Shukla, J. Power Sources, 1993, (41), 99).

In addition to the approaches to suppress hydrogen evolution, embodiments disclosed herein also utilize the hydrogen evolved during charging. In one embodiment, a specially-designed bilayer composite electrode structure is integrated into the iron electrode 12 for generating electricity from the hydrogen evolved during charge and self-discharge, thus minimizing the loss in round-trip energy efficiency due to self-discharge and inefficient charging.

Energy can be generated by electrochemically oxidizing the hydrogen. This will recover at least 60% of the energy loss arising from hydrogen evolution. To this end, a composite, iron electrode that allows for both processes, namely, the charging of the iron electrode 12 and the oxidation of hydrogen, to occur simultaneously is shown in FIGS. 2a, 2b, and 3.

In this embodiment, the iron electrode 12 structure may be prepared by sintering of the iron powders but it may also have holes 14 distributed over the surface as shown in FIGS. 2a and 2b. Holes or other openings 16 may also be provided in a porous conducting structure 18 covering or enclosing the iron electrode 12 to allow access of the liquid electrolyte 10, as depicted in FIG. 3. Either structure may be integrated with a fuel cell-style, gas diffusion electrode 20 that will allow for the hydrogen oxidation to occur. High surface area nickel 22 may be used as a catalytic surface for hydrogen oxidation. The iron electrode 12 and hydrogen electrode 20 may be electrically insulated with an insulating layer 24 between the electrodes 12, 20 and sandwiched together as a bi-layer. Separate electrical contacts 25 are provided to the iron and hydrogen electrodes 12, 20. The overall reaction for the hydrogen/oxygen couple is similar to that in an alkaline fuel cell as shown in the following electrochemical reactions.

Overall reaction: $H_2 + \frac{1}{2}O_2 \rightarrow H_2O$

Anode: $H_2 + 2OH^- \rightarrow 2H_2O + 2e^-$

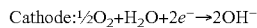

Cathode: $\frac{1}{2}O_2 + H_2O + 2e^- \rightarrow 2OH^-$

Figure 4:
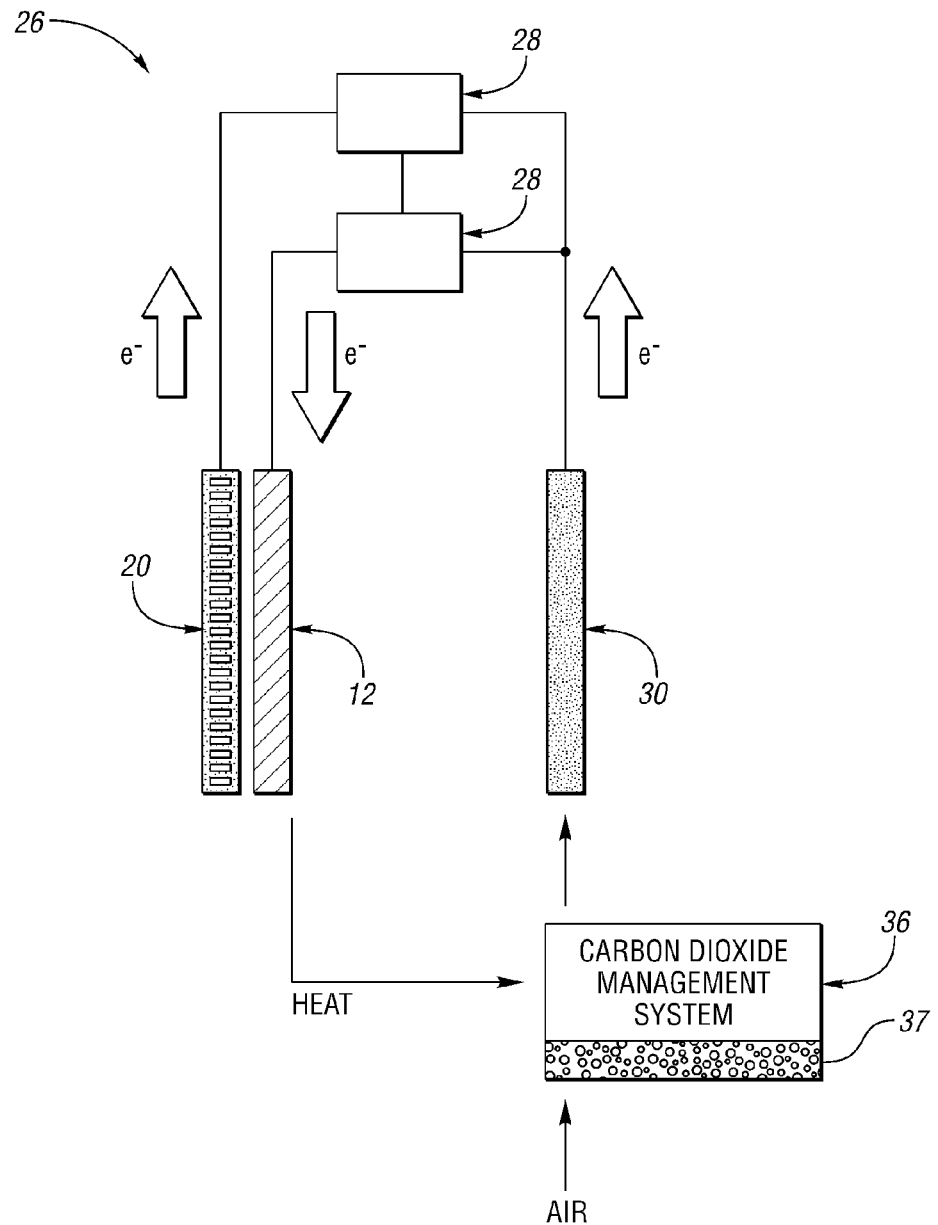
FIG. 4 is a schematic representation of a charging system for an iron-air battery in accordance with an embodiment.

A schematic of a charging system 26 for implementation with a composite electrode 12, 20 as described above is shown in FIG. 4. One or more charge/discharge controllers 28 may be designed to charge the iron electrode 12 but may also allow the hydrogen electrode 20 to discharge at the same time. The power generated from the hydrogen electrode 20 may be fed to the charging system 26 to offset some of the power needed to charge the iron electrode 12, thereby enhancing the efficiency of the charging process. During discharge of the iron-air cell 100, the iron electrode 12 and the hydrogen electrode 20 may be isolated so that only the iron electrode 12 is involved in power delivery. The hydrogen generated during non-operational periods may be used to trickle charge the iron-air battery 100.

In one embodiment, a nano-structured corrosion resistant imide whisker substrate 31 is used as a catalyst support for the bifunctional air electrode 30 for decreasing oxidative degradation of carbon-supported catalysts used for the air electrode 30 and increasing the cycle life of the air electrode.

One of the major limitations of current iron-air batteries is that their durability is limited to 2000 cycles. The major reason for the low cycle life is the corrosion-induced degradation of the conventional carbon-based catalyst supports used in the air electrode. This embodiment eliminates this phenomenon by using nano-structured whisker supports 31 prepared from carboxidimide pigments (such as Perylene Red 149). These supports do not have elemental carbon, and have been shown to be robust at potentials as high as 1.5 V for 7500 hours as air electrodes. This type of substrate can be produced relatively inexpensively by a roll-to-roll dry thermal evaporation process. Perylene Red 149 is commercially available from BASF and is a relatively inexpensive starting material. For example, see U.S. Pat. No. 5,039,561 to Debe. In addition, other macrocyclic compounds such as, but not limited to, phthalocyanines could be used to prepare the whisker substrate 31.

In one embodiment, a thin film air electrode 30 with a nano-structured catalyst layer is employed to ensure a simple two-layer electrode design for efficient water management and stable operation. Such a structure prevents flooding and reduces the complexity of the electrode design while increasing cycle life.

The conventionally used electrode structure for the bi-functional air cathode consists of multiple layers of hydrophobically treated high surface area carbon-supported catalysts. In these electrodes, the three phase regions (gas-electrode-electrolyte boundary) are not stable and with time they are subject to flooding. Furthermore, even in the absence of flooding, air access can easily become diffusion-limited, either by improper three-phase balance or merely by an excessively long diffusion path length. The disclosed embodiment includes an air electrode 30 with a thin film nano-structured catalyst layer 32 supported on a gas diffusion backing 34 to overcome these problems. This may result in the air electrode 30 being stable for more than 5000 cycles. The benefits of this type of structure arise from at least three distinct advantages over the conventional carbon electrode.

Prevention of flooding: The use of a nano-structured oxidation resistant support eliminates the loss of electrical contact and increase of pore size that occurs with cycling of conventional carbon electrodes. This allows for the use of a single gas diffusion layer, such as wet-proofed TORAY™ paper. The wet-proofing of such structures have been shown to be inherently very robust in fuel cells.

Short diffusion length for air: The diffusion path length in the nano-structured catalyst layer 32 is very short, compared to the labyrinth of pores for air access in conventional electrodes. In effect, the electrode 30 is designed to operate with stability in a flooded mode.

Removal of gases produced during charging: The thin film electrode wetted by the electrolyte inherently favors transport of gas to the outside during charge. Conventional catalyst layers are designed specifically with a surface tension gradient to transport the oxygen through the channels and pores. In the electrode design according to the disclosed embodiment, the evolved gas will simply move to the wet-proofed carbon paper because the hydrophobic surface is energetically more favorable for collecting gas bubbles. This transport process is assisted by the gas diffusion layer 34 being adjacent to site of gas evolution.

In one embodiment, catalytic oxide layers with the structure of pyrochlore, perovskite, and/or spinel are sputter-deposited onto a robust support (e.g., imide whisker substrate described above) for bi-functional operation for reducing voltage losses during charge and discharge, providing a low-cost manufacturing process for the air electrodes 30, and increasing round-trip efficiency.

The bi-functional air electrode 30 should support oxygen evolution and oxygen reduction with minimal voltage losses. The nano-structured oxidation resistant substrates described above may be coated with a thin layer of catalytically active perovskite, pyrochlore, and/or spinel oxides to form a catalyst surface that can operate efficiently in a bi-functional mode. This embodiment uses the sputter deposition process for the preparation of a single layer of catalytic oxides. Only a thin layer of catalytic oxide will be needed for the function, as this electrochemical reaction occurs at the interface of the catalyst and the electrolyte. Sputter-deposition is ideally suited for the uniform deposition of thin films, and any composition of the oxide can be deposited. Sputter-deposition is a widely used manufacturing technique for preparation of functional surfaces and is economically very attractive compared to wet chemical processing methods. With reactive sputter-deposition, a range of compositions can be prepared simply by changing the ratio of the sputtering power applied to the targets and by varying the pressure of oxygen in the deposition chamber. Among the perovskite oxides, low-cost materials such as lanthanum iron nickelate (La $Fe_xNi_{(1-x)}O_3$). and La $Ca_{0.4}CoO_3$ are contemplated, for example, as these have shown very promising cyclability and bifunctional activity in earlier studies in alkaline media (L. Jorissen, J. Power Sources, 2000, (155), 23). The performance of the perovskite catalyst is strongly dependent on its composition, especially for the oxygen evolution reaction. Therefore, substitution of the lanthanum with strontium for increased oxygen evolution activity is also contemplated. A recent report has also shown that bismuth iridum oxide pyrochlore oxides are very active for oxygen evolution and oxygen reduction (K. Koga et al., ECS Trans. 2008, (11) Iss. 32, 101). Sputter-deposited $Bi_2Ir_2O_{7-x}$ may also a suitable alternative to the perovskite oxides. A spinel oxide such as nickel cobalt oxide with $NiCo_2O_4$ may also be used in the place of pyrochlore or perovskite oxides.

In one embodiment, a carbon dioxide management system 36 is utilized using oxygen generated on charge for regeneration, thus eliminating rapid carbonation of the electrolyte 10 and energy efficient regeneration. The carbon dioxide management system 36 rapidly adsorbs carbon dioxide from the air that is supplied to the air electrode 30, utilizing a carbon dioxide absorbent that is regenerated between the charge and discharge operations on the battery 100.

In one embodiment, a carbon dioxide management system 36 is utilized using oxygen generated on charge for regeneration, thus eliminating rapid carbonation of the electrolyte 10 and energy efficient regeneration. The carbon dioxide management system 36 rapidly adsorbs carbon dioxide from the air that is supplied to the air electrode 30, utilizing a carbon dioxide absorbent 37 that is regenerated between the charge and discharge operations on the battery 100.

To avoid carbonation of the electrolyte, this embodiment passes the incoming air through an absorbent 37 that weakly binds to the $CO_2$. In this way, carbon dioxide-free air is fed to the iron/air cell during discharge. The heat generated from the cell during charge is then used to provide a small amount of thermal energy required for desorption of $CO_2$ from the absorbent 37. In addition, heat from another renewable energy source, like solar energy, may be used to regenerate the absorber bed. Also, the oxygen generated during charge may be used to purge out the $CO_2$ from the absorbent 37.

While water is a readily available absorbent for carbon dioxide, this embodiment utilizes nano-structured silica supported organo-amines, such as polyethyleneimines and polyethylene glycol, as a reversible absorbent for carbon dioxide with 100 times the absorption capacity of water. The absorption of carbon dioxide on nano-structured silica supported high molecular weight polyethyleneimine has been recently studied (A. Goeppert et al., Energy Environ. Sci., 2010, 3, 1949-1960) and the absorption capacities are as high as 140 mg of $CO_2$/g of absorbent. Because of the weak interaction of the carbon dioxide with the high molecular weight polyethyleneimines, absorbing and regenerating the carbon dioxide from this type of absorbent is much more efficient than thermally regenerated systems that require significant amounts of energy. Poly (ionic) liquids may also be used for absorbing carbon dioxide in this embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An iron-air rechargeable battery, comprising:
  a composite electrode including an iron electrode, a hydrogen electrode integrated therewith, and an insulating layer between the iron electrode and the hydrogen electrode;
  an air electrode spaced from the composite electrode; and
  an electrolyte in contact with the composite electrode and the air electrode.

2. The battery according to claim 1, further comprising self-assembling organic sulfur-based additives in the electrolyte.

3. The battery according to claim 2, wherein the organic sulfur additives are selected from the group consisting of alkane thiols, alkyl disulfides, unsubstituted and substituted aryl thiols, and hydroxyalkanethiols.

4. The battery according to claim 1, wherein the iron electrode comprises a bismuth additive.

5. The battery according to claim 1, wherein the iron electrode is covered with a porous conducting structure that has holes for access of the electrolyte.

6. The battery according to claim 1, wherein the composite electrode further comprises a catalytic surface comprising nickel for hydrogen oxidation.

7. The battery according to claim 1, wherein the iron electrode and hydrogen electrode have separate electrical contacts and are in communication with respective charge/discharge controllers.

8. The battery according to claim 1, wherein the iron electrode and the hydrogen electrode are isolated during discharge so that only the iron electrode is involved in power delivery.

9. The battery according to claim 1, wherein the air electrode includes a whisker substrate as a catalyst support, the whisker substrate without elemental carbon.

10. The battery according to claim 9, wherein the whisker substrate includes at least one of carboximide pigments and phthalocyanines.

11. The battery according to claim 9, wherein the whisker substrate is coated with a catalytically active oxide layer.

12. The battery according to claim 11, wherein the oxide layer includes at least one of perovskite oxide, pyrochlore oxide, or spinel oxide.

13. The battery according to claim 1, wherein the air electrode includes a catalyst layer supported on a gas diffusion layer.

14. The battery according to claim 1, further comprising a carbon dioxide management system that adsorbs carbon dioxide from air that is supplied to the air electrode.

15. The battery according to claim 14, wherein the carbon dioxide management system includes a carbon dioxide absorbent that is regenerated between the charge and discharge operations on the battery.

16. The battery according to claim 15, wherein the absorbent includes a silica-supported organo-amine absorbent through which incoming air is passed and which weakly binds carbon dioxide.

17. The battery according to claim 16, wherein the absorbent is selected from the group consisting of polyethyleneimine, polyethylene glycol, and poly (ionic) liquids.

18. The battery according to claim 15, wherein heat generated from the battery during charge is used to provide thermal energy for desorption of carbon dioxide from the absorbent.

19. A method for charging an iron-air battery, the battery comprising a composite electrode including an iron electrode, a hydrogen electrode integrated therewith, and an insulating layer between the iron electrode and the hydrogen electrode, an air electrode spaced from the iron electrode, and an electrolyte in contact with the iron electrode and the air electrode, the method comprising:

charging the iron electrode while allowing the hydrogen electrode to discharge at the same time; and isolating the iron electrode and the hydrogen electrode during discharge so that only the iron electrode is involved in power delivery.

20. The method according to claim 19, further comprising feeding power generated from the hydrogen electrode to a charging system to offset at least a portion of power needed to charge the iron electrode.

21. The method according to claim 19, further comprising trickle charging the iron-air battery using hydrogen generated during non-operational periods.

22. An iron-air rechargeable battery, comprising:

a composite electrode including an iron electrode and a hydrogen electrode integrated therewith;

an air electrode spaced from the composite electrode; and an electrolyte in contact with the composite electrode and the air electrode;

wherein the iron electrode is covered with a porous conducting structure that has holes for access of the electrolyte.

23. The battery according to claim 22, further comprising self-assembling organic sulfur-based additives in the electrolyte.

24. The battery according to claim 22, wherein the iron electrode comprises a bismuth additive.

25. The battery according to claim 22, wherein the composite electrode further comprises a catalytic surface comprising nickel for hydrogen oxidation.

26. The battery according to claim 22, further comprising an insulating layer between the iron electrode and the hydrogen electrode.

27. The battery according to claim 22, wherein the iron electrode and hydrogen electrode have separate electrical contacts and are in communication with respective charge/discharge controllers.

28. The battery according to claim 22, wherein the iron electrode and the hydrogen electrode are isolated during discharge so that only the iron electrode is involved in power delivery.

29. The battery according to claim 22, wherein the air electrode includes a whisker substrate as a catalyst support, the whisker substrate without elemental carbon.

30. The battery according to claim 29, wherein the whisker substrate is coated with a catalytically active oxide layer.

31. The battery according to claim 22, wherein the air electrode includes a catalyst layer supported on a gas diffusion layer.

32. The battery according to claim 22, further comprising a carbon dioxide management system that adsorbs carbon dioxide from air that is supplied to the air electrode.

33. The battery according to claim 32, wherein the carbon dioxide management system includes a carbon dioxide absorbent that is regenerated between the charge and discharge operations on the battery.

34. The battery according to claim 33, wherein the absorbent includes a silica-supported organo-amine absorbent through which incoming air is passed and which weakly binds carbon dioxide.

35. The battery according to claim 33, wherein heat generated from the battery during charge is used to provide thermal energy for desorption of carbon dioxide from the absorbent.

* * * * *